Jan. 18, 1966     S. REESE     3,229,616
VERTICAL BROILER
Filed April 29, 1964     2 Sheets-Sheet 2
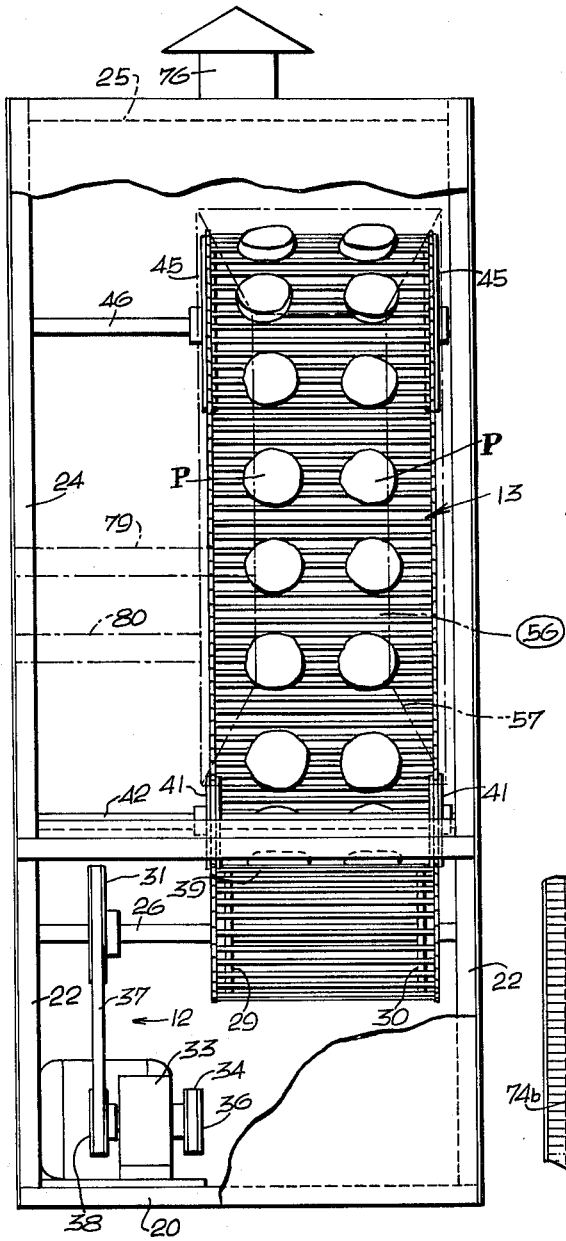
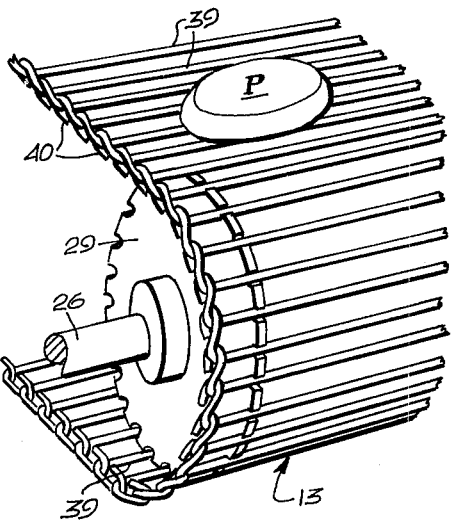
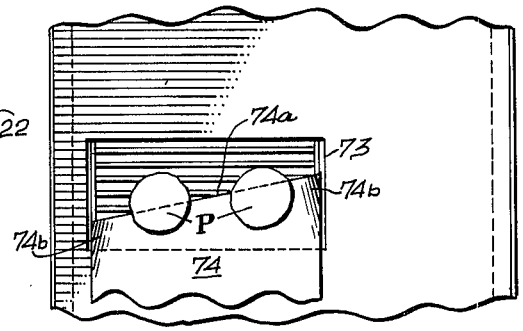
INVENTOR.
SY REESE
BY
E. H. Schmidt
ATTORNEY.

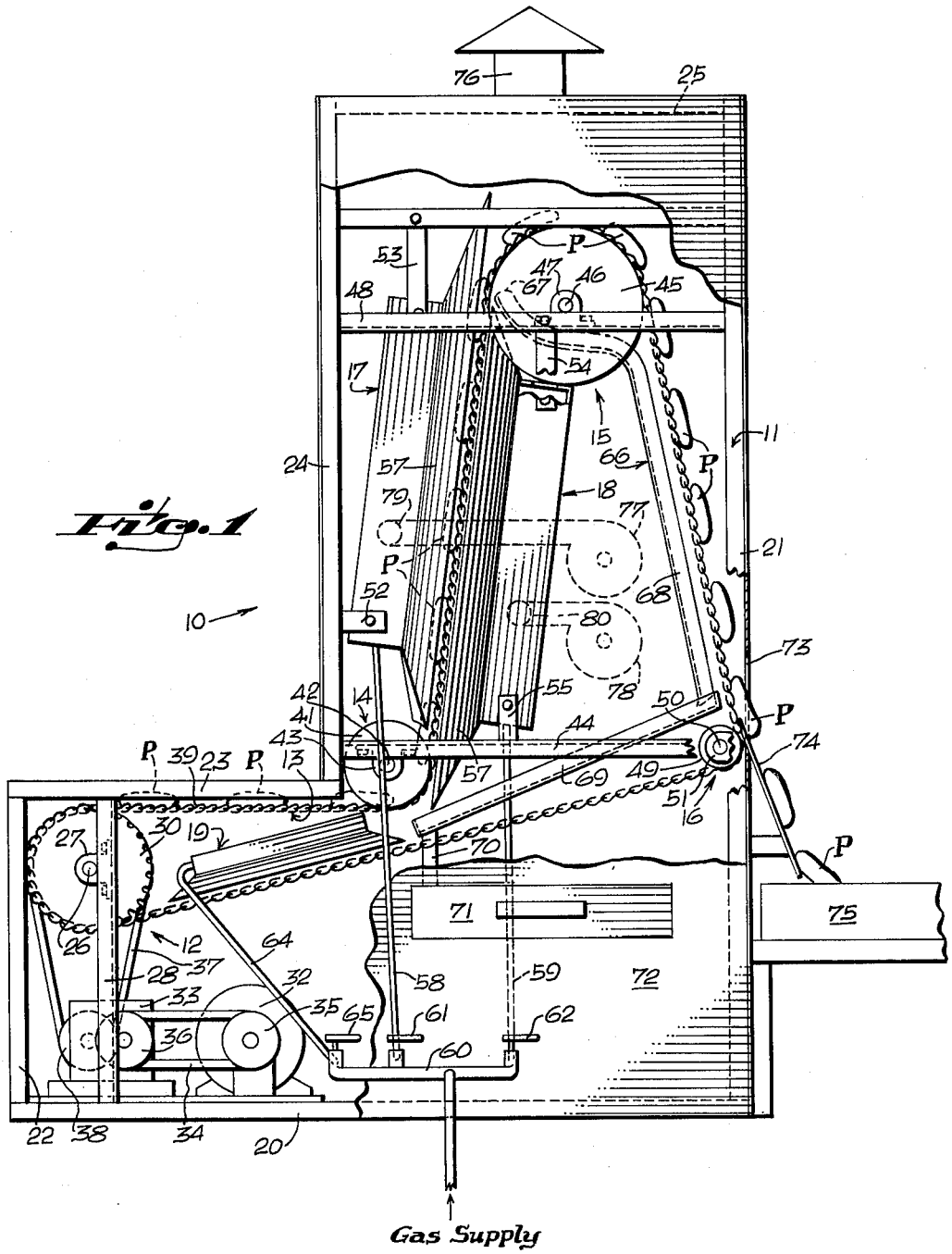

United States Patent Office 3,229,616
Patented Jan. 18, 1966

3,229,616
VERTICAL BROILER
Sy Reese, 2360 Bay View Lane, North Miami, Fla.
Filed Apr. 29, 1964, Ser. No. 363,446
9 Claims. (Cl. 99—386)

My invention relates to meat cooking devices and is directed particularly to apparatus for automatically and continuously broiling flat meat portions, such as hamburger patties, while in a vertical or on-end position.

It is presently common practice to cook hamburger meat patties on a flat horizontal grill heated from below. Such grilling, however, not only requires frequent cleaning or scraping of the grill surface to avoid the objectionable taste of burned fat and meat particles left on the grill from previously grilled patties, but also results in fouling of the grilling apparatus and burners with fat drippings, and fouling of the smoke exhaust system because of the heavy fat particles content of the smoke. Burned fats, moreover, which cannot readily be avoided in cooking on flat horizontal grills, are also suspected by medical researchers as being carcinogens or cancer causing agents.

It is accordingly the principal object of my invention to provide a novel automatic broiler for hamburger patties and the like wherein broiling is done while the patties pass substantially vertically or on-end past vertically-arranged heat-radiating members, whereby the fat will drip away from the patties as soon as heated to fluid temperature to avoid excess heating and consequent burning of the fat.

A more particular object is to provide a vertical broiler of the character above described wherein the patties are carried along the substantially vertical path past the heat-radiating members by a continuously driven grid belt comprised of transverse parallel grid elements kept at a high enough temperature to sear the meat patties upon contact when placed thereon, whereby the patties will be held to the belt during its substantially vertical run portions.

Still another object of the invention is to provide a vertical broiler of the above nature which will be economical in structure, simple in design, fool-proof in operation, easy to clean, substantially smokeless in operation, durable in use, and capable of broiling hamburger patties and the like in such a manner as results in superior taste and quality in continuous, quantity production.

Other objects, features and advantages of the invention will be apparent from the following description when read with reference to the accompanying drawings.

In the drawings, wherein like reference numerals denote corresponding parts throughout the several views:

FIG. 1 is a side elevational view of a vertical broiler embodying the invention, with portions of the side cover broken away to show the operating mechanism, FIG. 2 is a front elevational view of the broiler shown in FIG. 1, with portions of the front cover broken away, FIG. 3 is an oblique view of a portion of the grid belt conveyor and its drive mechanism, illustrating constructional details thereof, and FIG. 4 is a partial view of the rear of the apparatus illustrating details of the pattie removal chute.

Referring now in detail to the drawings, the numeral 10 in FIGS. 1 and 2 designates a vertical broiler according to my invention, the same comprising, generally, a supporting framework 11, a drive sprocket mechanism 12, a wide, chain-linked metal grid belt 13 driven by the sprocket mechanism, idler pulley mechanisms 14, 15 and 16 arranged to carry the grid belt along a changing path including horizontal and substantially vertical travel portions, a pair of front and rear radiant-heater elements 17, 18, respectively, arranged to broil the meat portions from each side as they move up along the substantially vertical portion of their path of travel, and radiant-heater element 19 arranged to preheat the conveying grid belt just prior to placement of the meat portions therein to insure attachment by searing action.

The supporting framework 11 is preferably constructed of welded angle-iron members, and, as illustrated, comprises a rectangular base frame 20 having rear corner upright members 21, comparatively short front corner upright members 22, a pair of side members 23 extending horizontally inwardly from the top of said front corner upright members, a pair of upright members 24 extending upwardly from the inner ends of said side members and coextensive with said rear corner upright members, and a rectangular top frame 25 interconnecting the upper ends of the upright members 24 and the rear corner upright members 25.

The drive sprocket mechanism 12 comprises a drive shaft 26 transversely disposed below the frame side members 23 at the front of the apparatus, and journalled in bearing members 27 secured to vertical brace members 28 fixed between said side members and the base frame 20. The drive shaft 26 has secured thereto a pair of spaced sprockets 29, 30 at one side, and a pulley wheel 31 at the other side (see FIG. 2), and is driven by an electric motor 32 through a speed-reduction gearbox 33, said motor and gearbox being secured in any convenient manner to the base frame 20. Driving interconnection between the motor 32 and the drive shaft 26 is achieved through a first drive belt 34 transmitting power between the motor output pulley 35 and the gearbox input pulley 36, and a second drive belt 37 transmitting power between output pulley 38 of said gearbox and the pulley wheel 31.

As is best illustrated in FIGS. 1 and 3, the grid belt 13 is in the form of an endless loop, and comprises spaced, parallel, transverse grid elements 39 the ends of which are looped in chain fashion, as indicated at 40 in FIG. 3, to provide longitudual flexibility. The grid belt is drivingly engaged at each side by the spaced sprockets 29, 30 of the drive sprocket mechanism 12, and first extends along a horizontal path slightly beneath the front frame side members 23. The grid belt 13 changes its horizontal path of travel to a substantially vertical path at a position just inside the upright members 24, by guidance around the idler pulley mechanism 14, which comprises a pair of idler pulley members 41 carried in a shaft 42 journalled in bearing members 43 secured to horizontal brace members 44 fixed between said upright members and the rear corner upright members 21. At the upper end of its substantially vertical path of travel the belt is reversed to move downwardly and slightly backwardly by means of the idler pulley mechanism 15, which comprises a pair of idler pulley members 45 carried on a shaft 46 journalled in bearing members 47 secured to horizontal brace members 48 fixed between the upright members 24 and the rear corner upright members 21. The idler pulley mechanism 16 is comprised of spaced pulleys 49 secured to a shaft 50 journalled in bearing members 51 secured to the rear ends of the horizontal brace member 44, and serves to guide the grid belt in its downwardly-inclined return path to the drive sprockets 29, 30.

Means is provided for broiling meat portions or patties P conveyed by the grid belt 13 as said belt rises along its substantially vertical path between the idler pulley mechanisms 14 and 15. To this end the rectangular radiant heaters 17 and 18 are fixed in spaced parallel relation to the front and back of the grid belt 13 in its upwardly-extending, substantially vertical path of movement, said heaters being mounted in any convenient manner, such as by interconnecting brackets 52, 53, 54 and 55, to the broiler apparatus framework. Preferably, the radiant heaters 17, 18 are gas infrared burners having flat heat-radiating surfaces (indicated generally at 56 in FIG. 2) surrounded by angular reflectors 57 for concentrating heat forward of the radiating surfaces. Such burners are manufactured by the C. A. Olsen Manufacturing Company of Elyria, Ohio, under the trade name "Infralux." The heaters 17, 18 are fed through gas conduits 58, 59 respectively, leading from a gas manifold 60 fitted with gas control valves 61, 62, respectively.

The third radiant gas heater, 19, which is of the same type as the heaters 17 and 18, is secured to the broiler framework in any convenient fashion to direct heat downwardly upon the return run of the grid belt 13 at a position just rearward of its engagement with the drive sprocket mechanism 12, which burner serves to sufficiently heat the transverse grid elements 39 of said belt to insure searing of the meat portions or patties P when placed upon the horizontal position of belt run at the front of the broiler. A gas conduit 64 leading from the gas manifold 60 through a control valve 65 feeds the gas heater 19.

Means is provided for catching and collecting the fat drippings as the meat portions or patties pass through the vertical broiler. To this end, a catch trough 66 is provided, having an arcuate portion 67 disposed just under the shaft 46 of the top idler pulley mechanism 15, and a downwardly and backwardly-extending portion 68 arranged in spaced parallel relation behind the downward and backward run of the grid belt 13. The lower end of the catch trough 66 drains into a catch pan 69 which extends forwardly and downwardly under the upwardly-moving or broiling portion of the path of belt travel. The catch pan 69 also serves to catch drippings from the patties P as they are broiled by the radiant heaters 17 and 18, which drippings fall free of the belt and lower ones of the patties P because the conveyer grid belt 13 is slightly inclined with respect to the vertical, as is clearly illustrated in FIG. 1. The lower end of the catch pan 69 drains through a short pipe 70 into a catch basin 71, which may be slidably arranged for removal for emptying through an opening in a side panel 72 (partially shown in FIG. 1) which incloses the left hand side of the broiler. Side panels similarly cover the remaining vertical sides and top of the broiler to enclose the operating mechanism. A slot 73 is provided in the rear cover panel through which a pattie removal chute 74 extends upwardly to within close proximity of the conveyer belt 13 and serves to "scrape" the broiler patties from the belt and deliver them to a pan 75 suitably placed at the lower end of said chute. As illustrated in FIG. 4, the upper end of the chute 74 is cut at an angle, as indicated at 74a, where it contacts the conveyer belt, and that the corners are bent outwardly, as indicated at 74b. Such structure prevents jamming with the conveyer belt and at the same time provides a gentler shearing action in the removal of the patties.

An ordinary draft diverter 76 is installed in the top panel enclosing the upper end of the broiler. Electric air blowers 77, 78 are preferably provided for supplying non-contaminated primary air through conduits 79 and 80, respectively, to the heater burners for combustion, and to insure against overheating and consequent inefficient operation of the burners.

In use, the patties P, upon placement on the front horizontal portion of the conveyer belt 13 preheated by the radiant heater 19, will be seared by and thereby become attached to the rod-like transverse grid elements 39 of the belt, so that they will be carried without displacement through the substantially vertical upward (broiling) and downward (return) runs of the path of belt travel. They will then be scraped off by the chute 74 to be delivered into the pan 75 to complete the continuous broiling cycle.

It is to be particularly noted that the broiling process, all liquified fat falls free of the patties as soon as it becomes sufficiently fluid, thereby minimizing any possibility of burning or smoking. The arrangement is such, also, that the necessity for cleaning is kept to a minimum, since all fat drippings are guided into a common collection pan along simple, easily-cleaned guide troughs.

While I have illustrated and described herein only one form in which my invention may conveniently be embodied in practice, this form is presented by way of example only and not in a limiting sense. For example, instead of relying on the searing action of the conveyer rods in holding meat portions in place, metal clips or barbs, or other holding means could instead be employed, especially in instances where heavier meat portions such as thick steaks are to be broiled. The invention, in brief, comprises all the embodiments and modifications coming within the scope and spirit of the following claims:

What I claim as new and desire to secure by Letters Patent is:

1. In a vertical broiler, the combination comprising, a continuous, wide, longitudinally-flexible conveyer belt comprising metallic transverse members, means for guiding said belt along a closed path including a substantially horizontal run and a substantially vertical run, means for securing meat portions to said belt for movement therewith along said substantially vertical run, a first radiant heater in spaced face-to-face parallel relation to said belt at one side of said substantially vertical run for broiling meat portions travelling on said belt, and means for automatically removing said meat portions from said belt after having been broiled by said radiant heater, said meat portions securing means comprising means heating said metallic transverse members of said conveyer to a high enough temperature to effect searing of the meat portions when placed thereon at said substantially horizontal run, whereby said meat portions will stick to said transverse members.

2. In a vertical broiler, the combination comprising, a continuous, wide, longitudinally-flexible conveyer belt comprising metallic transverse members, means for guiding said belt along a closed path including a substantially horizontal run and a substantially vertical run, means for securing meat portions to said belt for movement therewith along said substantially vertical run, a first radiant heater in spaced face-to-face parallel relation to said belt at one side of said substantially vertical run for broiling meat portions travelling on said belt, and means for automatically removing said meat portions from said belt after having been broiled by said radiant heater, said meat portions securing means comprising a heater member so placed as to heat said conveyer at a position just prior to its entering said substantially horizontal run, whereby the meat portions will be seared when placed upon said substantially horizontal run and thereby stick to said transverse members.

3. In a vertical broiler, the combination comprising, a continuous, wide, longitudinally-flexible conveyer belt comprising metallic transverse members, means for guiding said belt along a closed path including a substantially horizontal run and a substantially vertical run, means for securing meat portions to said belt for movement therewith along said substantially vertical run, a first radiant heater in spaced face-to-face parallel relation to said belt at one side of said substantially vertical run for broiling meat portions travelling on said belt, and means for automatically removing said meat portions from said belt after having been broiled by said radiant heater, said substantially vertical run being slightly inclined with respect to the vertical, whereby fat drippings will fall free of said conveyer and meat portions immediately following on said conveyer.

4. A vertical broiler as defined in claim 3 wherein said meat portions securing means comprises means heating said metallic transverse members of said conveyer to a high enough temperature to effect searing of the meat portions when placed thereon at said substantially horizontal run, whereby said meat portions will stick to said transverse members.

5. A vertical broiler as defined in claim 4 including a second radiant heater in spaced face-to-face parallel relation to the other side of said substantially vertical run for broiling meat portions travelling on said belt.

6. In a vertical broiler, the combination comprising, a continuous, wide, longitudinally-flexible conveyer belt comprising metallic transverse members, means for guiding said belt along a closed path including a substantially horizontal run and a substantially vertical run, means for securing meat portions to said belt for movement therewith along said substantially vertical run, a first radiant heater in spaced face-to-face parallel relation to said belt at one side of said substantially vertical run for broiling meat portions travelling on said belt, and means for automatically removing said meat portions from said belt after having been broiled by said radiant heater, said means for automatically removing said meat portions from said belt comprising a downwardly and outwardly-extending run in said conveyer path and following said substantially vertical run, and a flat chute having one end in scraping engagement against the outside of said downwardly and outwardly-extending run of said conveyer.

7. A vertical broiler as defined in claim 6 wherein said transverse members are comprised of spaced, parallel transverse rods, and wherein said one end of said flat chute is cut at an incline with respect to said transverse rods for shearing-off action with respect to the meat portions being carried thereby.

8. A vertical broiler as defined in claim 7 including a catch basin and a trough for catching and conveying grease drippings from meat portions being broiled on said conveyer belt into said catch basin.

9. A vertical broiler as defined in claim 8 wherein said first and second radiant heaters and said heating means each comprise gas burners.

References Cited by the Examiner

UNITED STATES PATENTS 1,674,555   6/1928   Leone et al. _____ 99—404
2,142,390   1/1939   Zerr _____ 99—420

FOREIGN PATENTS 1,267,228   6/1961   France.

WALTER A. SCHEEL, *Primary Examiner.*

ROBERT W. JENKINS, *Assistant Examiner.*